US006573496B2

(12) United States Patent
Harada

(10) Patent No.: US 6,573,496 B2
(45) Date of Patent: Jun. 3, 2003

(54) QUADRUPOLE MASS SPECTROMETER

(75) Inventor: Shigetoshi Harada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 210 days.

(21) Appl. No.: 09/748,171

(22) Filed: Dec. 27, 2000

(65) Prior Publication Data

US 2001/0009266 A1 Jul. 26, 2001

(30) Foreign Application Priority Data

Jan. 19, 2000 (JP) ....................................... 2000-009707

(51) Int. Cl.[7] .......................... H01J 49/42; B01D 59/44

(52) U.S. Cl. ....................... 250/293; 250/292; 250/281; 250/286; 250/423 R

(58) Field of Search ................................ 250/286, 292, 250/293, 281, 423 R

(56) References Cited

U.S. PATENT DOCUMENTS 4,136,280 A * 1/1979 Hunt et al. ................. 250/292
5,850,084 A * 12/1998 Holkeboer .............. 250/423 R
6,153,880 A * 11/2000 Russ et al. .................. 250/292

* cited by examiner

*Primary Examiner*—Nikita Wells
(74) *Attorney, Agent, or Firm*—Kanesaka & Takeuchi

(57) ABSTRACT

In a quadrupole mass spectrometer, a controlling portion controls a lens power source to temporarily change a voltage applied to an ion lens according to a timing for controlling a quadrupole power source, so that excessive ions do not pass through a quadrupole filter. Therefore, the excessive ions are diffused on the way to thereby prevent the excessive ions from reaching a detector. Thus, at the time of operation, a large quantity of ions, such as carrier gas molecular ions, unnecessary for the analysis is prevented from being introduced into the detector to deteriorate thereof.

7 Claims, 2 Drawing Sheets

QUADRUPOLE MASS SPECTROMETER

BACKGROUND OF THE INVENTION AND RELATED ART STATEMENT

The invention relates to a quadrupole mass spectrometer.

The quadrupole mass spectrometer has a structure, wherein a sample molecule or ion is ionized in an ion source, and the ions produced therein are introduced into a quadrupole filter to allow only the ions with a predetermined mass number to selectively pass therethrough to thereby detect the passed ions at a detector. Since the mass number of the ions passing through the quadrupole filter is changed according to a voltage applied thereto, the mass number of the ions reaching the detector can be scanned or controlled over a predetermined mass region by scanning the voltage applied thereto. This is, what is called, a scanning by the quadrupole mass spectrometer.

In a gas chromatograph mass spectrometer (hereinafter referred to as "GC/MS") wherein a gas chromatograph (hereinafter referred to as "GC") is connected to a preceding step of a mass spectrometer (hereinafter referred to as "MS"), since sample component molecules separated during movement together with a carrier gas in a column of the GC are introduced into an ion source of the MS, a fairly large amount of carrier gas molecules when compared with a specified component, is supplied to the ion source. Also, in case impurity components contained in a sample gas including a main component are analyzed by the MS, a fairly large amount of the main component molecules as compared with the specified component, i.e. impurity components, is supplied to the ion source.

As a matter of course, the carrier gas molecules and the main component molecules are ionized in the ion source. A quantity of these ions is extremely large as compared with those produced from the molecules of the specific component. In case such a large amount of ions passes through the quadrupole filter and reaches the detector in a short time, the detector is saturated with these ions to thereby deteriorate its characteristics. In order to prevent the saturation, a sensitivity of the detector can be lowered beforehand. However, in case the specific component is a very small amount, when the sensitivity of the detector is lowered, the specific component itself can not be detected or a detecting accuracy becomes poor, which deteriorates an analysis.

Therefore, when a scanning or operation is carried out by a conventional mass spectrometer, a mass region except for a mass number corresponding to the undesired excessive ions has been set. More specifically, for example, in case the mass number of the excessive ions is m1 and a mass region of m2–m3 (m2≦m1≦m3) is scanned, it has been required to carry out two scannings by setting two mass regions, such as m2–m1 (not including m1) and m1–m3 (not including m1). Therefore, the scanning work becomes complicated and a working efficiency is poor.

To solve the above problems, the present invention has been made and an object of the invention is to provide a quadrupole mass spectrometer, which can eliminate the bad influence of excessive ions to a detector without setting, in scanning, a mass region including a mass number corresponding to the excessive ions unnecessary for analysis.

Another object of the invention is to provide a quadrupole mass spectrometer as stated above, wherein an analysis can be carried out with high sensitivity and accuracy.

Further objects and advantages of the invention will be apparent from the following description of the invention.

SUMMARY OF THE INVENTION

In order to attain the above objects, a quadrupole mass spectrometer of the invention includes an ion source for ionizing a sample molecule; a quadrupole filter for selectively passing ions with a specific mass number among the ions generated in the ion source; and a detector for detecting the ions passing through the quadrupole filter. In the quadrupole mass spectrometer, when a voltage to be applied to the quadrupole filter is scanned or arranged to successively change a mass number of the ions passing through the quadrupole filter, a DC-type electric field is temporarily changed at a space between the ion source and the quadrupole filter or a part of the space according to a timing of passage of the ions having the specific mass number set in advance and passing through the quadrupole filter.

Normally, an ion lens for converging the ions is disposed between the ion source and the quadrupole filter. In this case, in the quadrupole mass spectrometer of the invention, a DC potential may be relatively changed between the ion lens and the ion source, the quadrupole filter and the ion source, or the quadrupole filter and the ion lens.

In the quadrupole mass spectrometer of the present invention, when the DC-type or linear electric field is temporarily changed at the time of scanning as described above, the ions to be introduced into the quadrupole filter from the ion source lose their kinetic energy in the middle of their path to suddenly decelerate their flight speed, change their converging state, or are not drawn out from the ion source. Therefore, when the ions having the specified mass number can pass through the quadrupole filter, all the ions including the ions having the specified mass number are not introduced into the quadrupole filter, or the quantity of the introduced ions, if introduced, is extremely reduced. Also, even if the ions again start flying toward the quadrupole filter and reach the quadrupole filter after the electric field returns to the original state, at the time point, the quadrupole filter does not have the electric field for allowing the ions with the specific mass number to pass therethrough to thereby diffuse the ions in the middle of passage through an inner space of the quadrupole filter, so that the ions do not reach the detector.

Therefore, according to the quadrupole mass spectrometer of the present invention, even if the mass region is set to include a mass number corresponding to undesired excessive ions of molecules of a carrier gas or an unnecessary main component introduced into the ion source simultaneously with introduction of a specific component, the undesired excessive ions can be prevented from reaching the detector. Thus, it is not necessity to set the mass region to exclude the mass number corresponding to the undesired excessive ions as in the conventional mass spectrometer, so that a scanning or operation can be carried out effectively. Also, since there is no risk of saturating the detector with the excessive ions, it is not necessary to lower a sensitivity of the detector, so that an analysis with high sensitivity and accuracy can be performed.

DETAILED DESCRIPTION OF PREFERRED EMBODIMENTS

Figure 1:
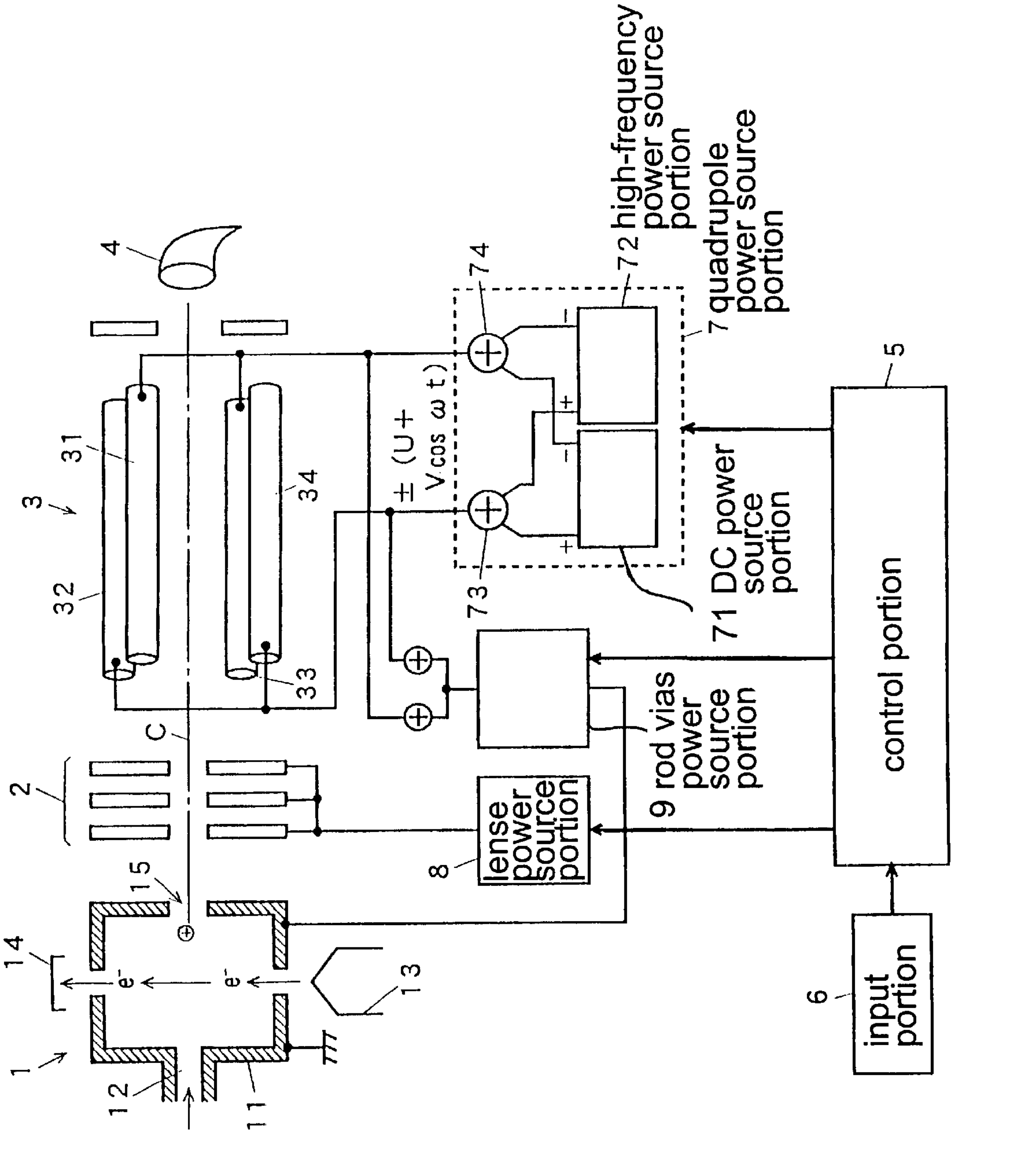
FIG. 1 is a block diagram showing essential parts of a quadrupole mass spectrometer of an embodiment according to the present invention.

Embodiments of a quadrupole mass spectrometer according to the present invention will be explained with reference to FIGS. 1 and 2(*a*)–2(*c*). FIG. 1 is a block diagram showing a structure of an essential part of a mass spectrometer of the present embodiment, and FIGS. 2(*a*)–2(*c*) are explanatory graphs of the mass spectrometer.

In an analyzing chamber, not shown, held in a vacuum state, an ion source 1, an ion lens 2, a quadrupole filter 3 and a detector 4 are disposed on a substantially straight line along an ion optical axis C. In the embodiment, an ion source 1 is utilized which may employ an electron shock method, or a chemical ionization method. A quadrupole power source portion 7 for applying a voltage to four rod electrodes 31–34 of the quadrupole filter 3 as described later, a lens power source portion 8 for applying a direct current (hereinafter referred to as "DC") voltage to the ion lens 2, and a rod bias power source portion 9 for applying a DC bias voltage to the rod electrodes 31–34, for determining a relative DC potential difference between an ionization chamber 11 and the rod electrodes 31–34, are respectively controlled by a controlling portion or device 5. Various parameters required for analysis are inputted to the controlling portion 5 from an input portion 6 operated by an operator. Such functions of the controlling portion 5 can be made by a personal computer including a central processing unit (hereinafter referred to as "CPU"), memory and the like.

Operations of the quadrupole mass spectrometer at a time of analysis are explained hereunder.

In the ion source 1, a sample introducing pipe 12 is connected to the ionization chamber 11, and gas sample molecules are introduced into the ionization chamber 11. A filament 13 for generating a thermoelectron is disposed outside a thermoelectron irradiation hole provided on a wall surface of the ionization chamber 11. When a temperature of the filament 13 is raised by supply of a heating current, the thermoelectron is discharged. A trap electrode 14 applied with a predetermined potential is provided outside an opening facing the thermoelectron irradiation hole, so that the thermoelectron is induced into the ionization chamber 11 by a potential difference between the filament 13 and the trap electrode 14, and further, accelerated toward the trap electrode 14. When the thermoelectron collides against the sample molecules, the electrons are hit out or ejected from the sample molecules, and the molecules become ions.

The ionization chamber 11 is grounded, and a DC voltage of an inverse polarity with respect to the ions is applied to the ion lens 2. Therefore, the ions generated in the ionization chamber 11 are drawn outside therefrom by an electric field generated by a potential difference between an interior of the ionization chamber 11 and the ion lens 2 or the quadrupole filter 3, and are accelerated. Then, after the ions are converged and accelerated by the ion lens 2, they are introduced into a space of the quadrupole filter 3 in a longitudinal direction. A quadrupole power source portion 7 includes a DC power source portion 71, a highfrequency power source portion 72 and two voltage superposition portions 73, 74. The DC power source portion 71 generates DC voltages of two types of ±U with mutually different polarities; the high-frequency power source portion 72 generates voltages of $\pm V \cdot \cos\omega t$ wherein the phases are mutually different by 180°; and the voltage superposition portions 73, 74 provide voltages of $\pm(U+V \cdot \cos\omega t)$. The 180° phase-shifted voltages are respectively applied to the adjacent rod electrodes among the four rod electrodes 31–34. Also, bias voltages having the same voltage value generated at a rod bias power source portion 9 are respectively applied to the rode electrodes 31–34. The voltage values U and V1 and the rod bias voltage value are set at the controlling portion 5.

The ions introduced into the quadrupole filter 3 are vibrated by an electric field generated by the voltages applied to the respective rod electrodes 31–34; only ions having mass numbers corresponding to the voltages U and V move forward at a speed determined by the rod bias voltage along the ion optical axis C to pass through the quadrupole filter 3; and ions having mass numbers other than the above-mentioned values are diffused in the filter 3. Only the ions having passed through the quadrupole filter 3 reach a detector 4 in which an ion current corresponding to an amount of the ions is produced.

Next, in the present mass spectrometer, characteristic operations when a scanning is carried out are explained.

An operator inputs a mass region and a mass number of undesired excessive ions included in the mass region as parameters necessary for a mass spectrometry, from an input portion 6. The mass number of the excessive ions is different depending on its analyzing conditions and measuring types. For example, in case a gas chromatograph is connected to a preceding step of the mass spectrometer, and a carrier gas of the GC is helium (hereinafter referred to "He"), a mass number of the excessive ions is 4. In the present embodiment, the mass number of the excessive ions is m1 and the mass region is m2–m3 (m2≦m1≦m3).

When a scanning or operation starts, first, the controlling portion 5 controls the quadrupole power source portion 7 to generate such a voltage that ions having a mass number m2 pass through the quadrupole filter 3. On the other hand, the controlling portion 5 controls the lens power source portion 8 to generate a predetermined DC voltage. A voltage value at this time, for example, is determined beforehand such that an amount of the ions reaching the detector 4 becomes maximum. Thereafter, the controlling portion 5 controls the quadrupole power source portion 7 such that the mass number of the ions passing through the quadrupole filter 3 is gradually increasing from m2. Thus, a DC voltage of negative polarity generated at the DC power source portion 71 changes, for example, as shown in FIG. 2(*b*). Incidentally, a DC voltage of positive polarity generated at the DC power source portion 71 and a voltage generated at the high-frequency power source portion 72 continuously change in the same manner. Thus, among various ions produced at the ion source 1, the mass number of the ions passing through the quadrupole filter 3 and detected at the detector 4 gradually increases from m2.

Figures 2A, 2B, 2C:
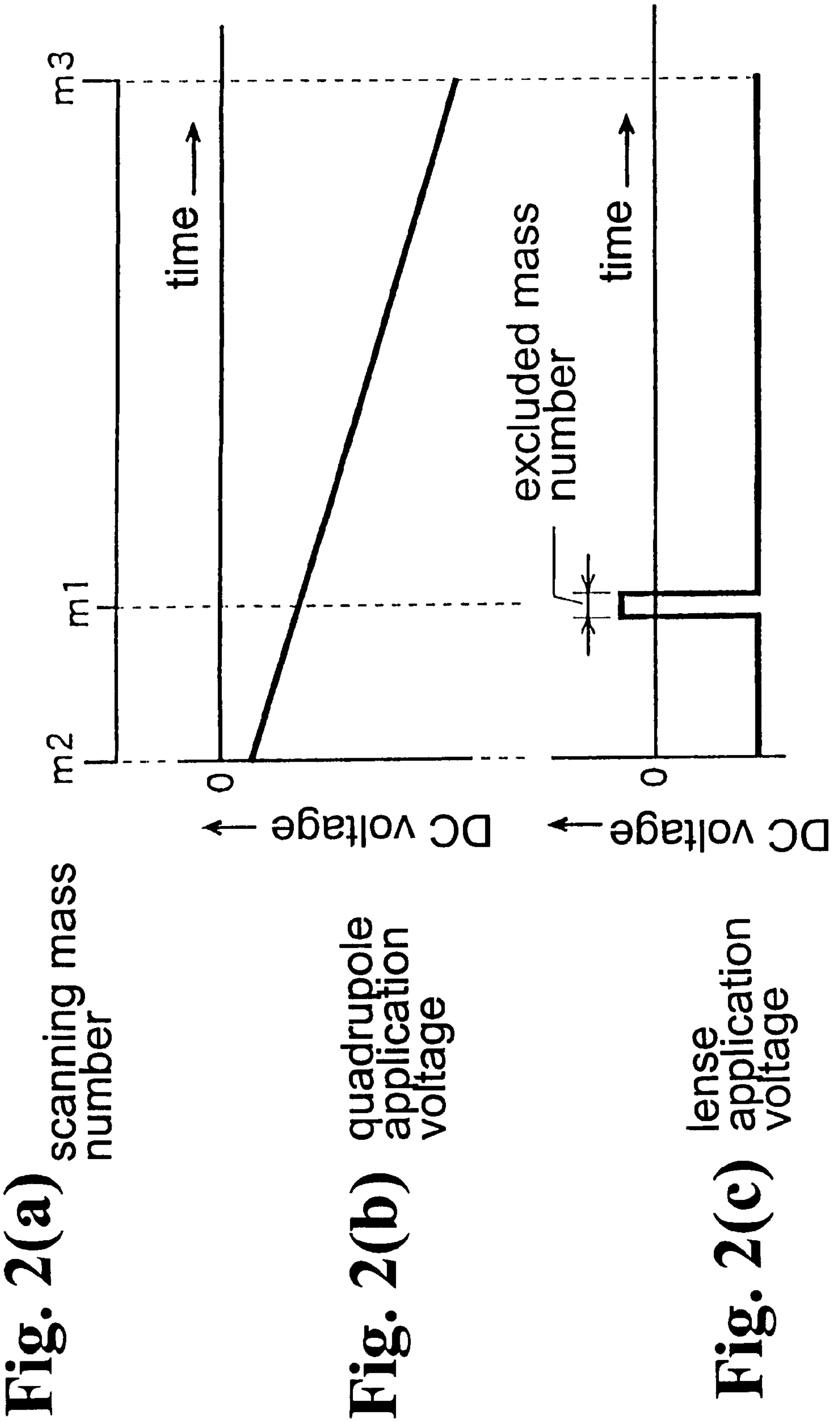
FIGS. 2(*a*)–2(*c*) are explanatory graphs in operation of the quadrupole mass spectrometer of the embodiment according to the present invention.

As shown in FIGS. 2(*a*) and 2(*c*), the controlling portion 5 controls the lens power source portion 8 such that the polarity of the DC voltage to be applied to the ion lens 2 is temporarily inverted, i.e. changed to a positive polarity in this case, in accordance with a timing for measuring ions having a mass number ml. Therefore, a power acts on the ions, which are drawn out of the ionization chamber 11 and are going to pass through the ion lens 2, in a direction opposite to their moving direction to thereby suddenly decrease the speed of the ions. Also, the ions, which are just going to be drawn out of the ionization chamber 11, are not provided with a kinetic energy in the direction of an ion optical axis C, so that the ions are not drawn out of the ionization chamber 11.

Then, in case the polarity of the voltage to be applied to the ion lens 2 is returned to the original polarity, the ions are again accelerated toward the quadrupole filter 3. However, when the ions have been introduced into the quadrupole filter 3, there is no electric field condition under which the ions having the mass number m1 can pass. Thus, the excessive ions having the mass number m1 are diffused on the way of passing the quadrupole filter 3. On the other hand, ions other than those having the mass number ml can pass through the quadrupole filter 3 to reach the detector 4, if the electric field condition allows the mass number to pass through the quadrupole filter 3 when the ions are introduced into the quadrupole filter 3. Therefore, according to the present mass spectrometer, when a scanning is carried out, even if the mass number of undesired excessive ions is included in the mass region, the quadrupole filter 3 prevents the undesired excessive ions from passing therethrough according to a timing of their passage to thereby prevent the excessive ions from reaching the detector 4.

Incidentally, in the above description, although the voltage is varied to invert the polarity of the voltage to be applied to the ion lens 2, the polarity is not necessarily inverted. At least, the voltage may be varied to reduce an amount of the ions to be introduced into the quadrupole filter 3 during a period when the ions having the mass number corresponding to the excessive ions can pass through the quadrupole filter 3.

Also, in the above embodiment, the potential of the ionization chamber 11 is fixed and the potential of the ion lens 2 is varied. However, there can be obtained the same effects when the potential of the ion lens 2 is fixed and the potential of the ionization chamber 11 is varied; or both the potentials of the ion lens 2 and the ionization chamber 11 are varied. Further, since the rod bias voltage to be applied to the quadrupole filter 3 has also an influence in drawing-out of the ions from the ionization chamber 11, the rod bias voltage may be varied.

Furthermore, not only when the positive ions are generated in the ion source 1, but also when the negative ions are generated, the same theory can be applied.

While the invention has been explained with reference to the specific embodiments of the invention, the explanation is illustrative and the invention is limited only by the appended claims.

What is claimed is:

1. A quadrupole mass spectrometer, comprising:

an ion source for ionizing a sample molecule, a quadrupole filter situated near the ion source for selectively passing ions among ions generated in the ion source, a detector situated near the quadrupole filter for detecting the ions having passed through the quadrupole filter, and a control device connected at least to one of the ion source and the quadrupole filter, said control device, when a voltage to be applied to the quadrupole filter is scanned to successively change a mass number of the ions passing through said quadrupole filter, temporarily changing a DC-type electric field of at least a part of a space between the ion source and the quadrupole filter according to a timing of passage of ions with a specific mass number set in advance through the quadrupole filter to thereby prevent the passage of the ions with the specific mass number.

2. A quadrupole mass spectrometer according to claim 1, further comprising an ion lens situated between the ion source and the quadrupole filter for introducing ions generated in the ion source to the quadrupole filter, and a lens power source connected to the ion lens to provide power thereto.

3. A quadrupole mass spectrometer according to claim 2, wherein said ion source includes an ion chamber for generating ions, and said quadrupole filter includes four rod electrodes situated adjacent to each other.

4. A quadrupole mass spectrometer according to claim 3, further comprising a rod bias power source connected to the ion chamber and the rod electrodes for selecting a potential difference of direct current therebetween, said control device being connected to the lens power source and the rod bias power source to control the same.

5. A quadrupole mass spectrometer according to claim 4, wherein said control means controls the lens power source to change a polarity of the lens when the passage of the ions with the specific mass number is diffused.

6. A quadrupole mass spectrometer according to claim 4, wherein potential of at least one of the lens power source, ion chamber and rod bias power source is changed when the passage of the ions with the specific mass number is diffused.

7. A quadrupole mass spectrometer according to claim 1, further comprising means for providing the DC-type electric field situated between the ion source and the quadrupole filter and connected to the control device, said control device allowing said means to change the DC-type electric field at a timing when the quadrupole filter detects the ions with the specific mass so that the ions with the specific mass number are prevented from entering the quadrupole filter.

* * * * *